United States Patent
Lyle et al.

(10) Patent No.: US 6,567,928 B1
(45) Date of Patent: May 20, 2003

(54) METHOD AND APPARATUS FOR EFFICIENTLY RECOVERING FROM A FAILURE IN A DATABASE THAT INCLUDES UNLOGGED OBJECTS

(75) Inventors: Robert W. Lyle, Morgan Hill, CA (US); James Z. Teng, San Jose, CA (US); Jay A. Yothers, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/576,303

(22) Filed: May 23, 2000

(51) Int. Cl.[7] .................................................. G06F 11/00
(52) U.S. Cl. ........................................ 714/15; 707/202
(58) Field of Search ................................ 707/202, 204; 714/15, 19, 20, 21, 16

(56) References Cited

U.S. PATENT DOCUMENTS

| | | | |
|---|---|---|---|
| 4,868,744 A | | 9/1989 | Reinsch et al. |
| 5,280,611 A | * | 1/1994 | Mohan et al. ................ 707/8 |
| 5,625,820 A | | 4/1997 | Hermsmeier et al. |
| 5,794,229 A | | 8/1998 | French et al. |
| 5,999,943 A | * | 12/1999 | Nori et al. ............... 707/104.1 |
| 6,243,718 B1 | * | 6/2001 | Klein et al. ................ 707/203 |
| 6,343,286 B1 | * | 1/2002 | Lee et al. ..................... 707/3 |
| 6,343,293 B1 | * | 1/2002 | Lyle ........................... 707/101 |
| 6,470,359 B1 | * | 10/2002 | Lyle ........................... 707/202 |
| 6,502,086 B2 | * | 12/2002 | Pratt ............................. 707/1 |

OTHER PUBLICATIONS

Spiro, Peter M. et al., "Designing an Optimized Transaction Commit Protocol",Digital Technical Journal, vol. 3, No. 1, Winter 1991.

* cited by examiner

*Primary Examiner*—Robert Beausoliel
*Assistant Examiner*—Chrsitopher McCarthy
(74) *Attorney, Agent, or Firm*—Kudirka & Jobse, LLP (57) ABSTRACT

Database tables which are to be loaded with large data objects (LOBs) are defined with a special logging attribute value. This attribute value causes the database management system to suspend recovery logging for the databases so defined, but to continue with the logging of control information, such as space management changes. Certain control information recovery log entries have a special status indicator. For LOBs, this status indicator is set to cause the associated LOB entry to be marked as invalid when the log entry is reapplied, for example, during a recovery operation from a media failure. Rather than invalidating the entire table, the database management system will only prevent access to the entries which have been invalidated during the recovery process.

20 Claims, 11 Drawing Sheets

METHOD AND APPARATUS FOR EFFICIENTLY RECOVERING FROM A FAILURE IN A DATABASE THAT INCLUDES UNLOGGED OBJECTS

FIELD OF THE INVENTION

The present invention relates generally to data recovery in a database management system after an abnormal system termination and, more specifically, to a database management system recovery method and apparatus that does not use data recovery logging.

BACKGROUND OF THE INVENTION

Databases store data in a variety of manners depending on the internal organization. For example, a relational database system, typically stores data in tables. The tables are comprised of rows, each of which contains a record. The record, in turn, contains fields and the fields contain the actual related data values for a data "object." Each table may also be associated with one or more indexes, which provide rapid access to the rows in an order determined by the index and based on key data values contained in selected fields in each row. As an example, a row might be associated with each employee of an organization and contain fields that hold such information as the employee name, an identification number, and telephone numbers. One index might order the rows numerically by employee identification number, while another index might order the rows alphabetically by employee name.

Such a database conventionally includes methods which insert and delete rows and update the information in a row. When changes are made to the rows, any database indexes associated with the table may also need to be updated in order to keep the indexes synchronized with the tables. The rows in each table are mapped to a plurality of physical pages on the disk to simplify data manipulation. Such an arrangement is illustrated in FIG. 1.

Figure 1:
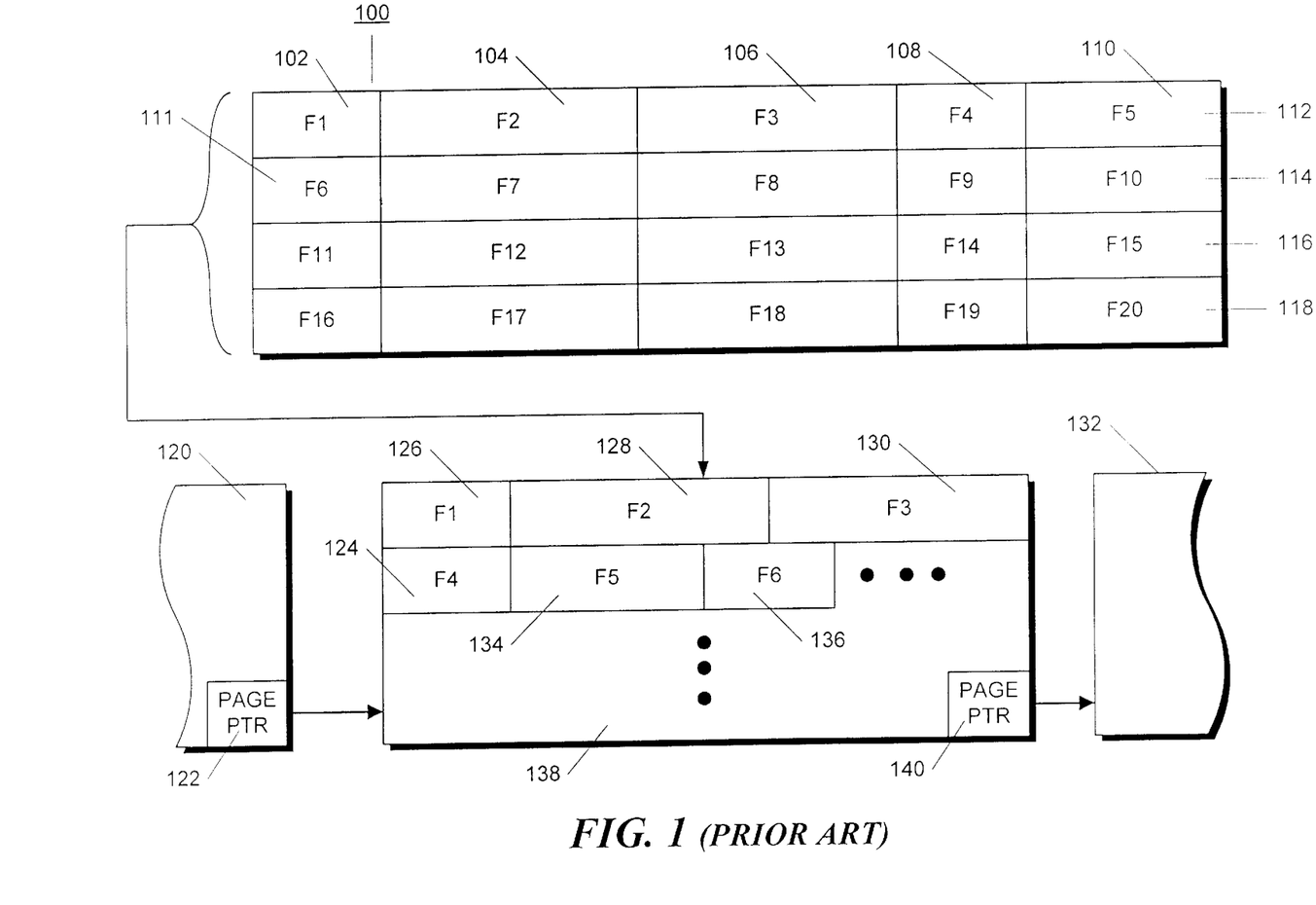
FIG. 1 illustrates, in block schematic form, the relationship of database table rows and data pages in a conventional database system.

In FIG. 1, table 100, which illustratively consists of rows 112, 114, 116, and 118, is mapped to a chain of pages which pages 120, 138, and 132 are shown. In the table illustrated, each row consists of five separate fields. For example, row 112 consists of fields 102, 104, 106, 108 and 110. The fields in each of rows 112, 114, 116 and 118 are mapped illustratively to page 138 which can contain data for more than one row. For example, field 102 maps to location 126 in page 138. Fields 104 maps to location 128. Field 106 maps to location 130. In a similar manner field 108 maps to location 124 and field 110 maps to location 134. The fields in the next row 114 are mapped directly after the fields in row 112. For example, field 111 is illustrated which maps to page location 136. When the page is completely filled with data, field information is mapped to the next page in the page chain. The pages are chained together by means of page pointers. For example, page pointer 122 links pages 120 and 138, whereas page pointer 140 links pages 138 and 132. All of the pages used to store the data in table 100 are linked together in a similar manner in a page chain.

The data pages are normally kept in a page buffer pool located in system memory. In order to make such a database system persistent or "durable", the data pages must be written to an underlying non-volatile storage system, such as a disk storage. This storage operation takes place on a page level so that when a modification is made to data on a page the entire page is stored in the persistent storage. Each page could be copied to the persistent storage as soon as data on the page was modified. However, this immediate copying greatly slows the system operation since persistent storage is generally much slower than RAM memory. Alternatively, the information in modified pages in the buffer pool can be copied or "flushed" to the disk storage at intervals. For example, the information could be flushed periodically or when the number of changed pages in the buffer pool reaches some predetermined threshold. During this disk flushing operation, the data modifications are performed "in place" so that the old data is either overwritten or deleted from the disk and lost.

Since the data is lost during the modification process, in order to ensure data integrity in the case of a system failure, or crash, the actions performed on the database are grouped into a series of "transactions". Each transaction is "atomic" which means that either all actions in the transaction are performed or none are performed. The atomic property of a transaction ensures that the transaction can be aborted or "rolled back" so that all of the actions which constitute the transaction can be undone. Database transactions commonly have a "commit" point at which time it can be guaranteed that all actions which comprise the transaction will complete properly. If the transaction does not reach the commit point, then it will be rolled back so that the system can return to its state prior to the initiation of the transaction. Consequently, if there is a system termination or crash prior to the commit point, the entire transaction can be rolled back.

The use of a buffer pool complicates transaction processing because even though a transaction has committed, system operation could terminate after a page has been modified, but before the modified page is flushed to disk. In order to prevent data loss caused by such a system interruption, a logging system is used to permit data recovery. The logging system records redo and undo information for each data modification in a special file called a "recovery log" that is kept in non-volatile storage.

The recovery log consists of an ordered list of redo/undo actions and contains information such as a transaction ID, a page ID, an offset length and the old and new data constituting the update. Additional control information is often included to facilitate the logging operation. This control data includes a transaction table which includes one record per active transaction that contains the transaction state (for example, running, committed or aborted.) The control information also includes a dirty page table which contains one entry for each page in the buffer pool which has been modified.

In order to ensure both atomicity and persistence for each transaction, a "write ahead" logging protocol is used. According to this protocol a log record is written for an update before the corresponding modified data page is written to disk. In addition, all log records are written for a transaction before the transaction is committed.

In addition to the recovery logging of data update information, recovery logging is also performed during storage space management procedures that involve allocation and deallocation of data pages for each database row. For example, a set of space-map pages are commonly maintained by the database system to handle storage space allocation and deallocation for each table. In general, each space-map page manages space allocation for a range of data pages and contains status information which indicates whether a particular data page on disk storage has been used. When a new data row is inserted into a table, the space-map pages associated with that table are examined and updated to allocate space for the row, if necessary. A recovery log entry is written for each change made to the space-map pages. These recovery logs can be used to free the allocated space if a transaction roll back occurs before the transaction has been committed.

The recovery logs are used to restart processing if system operation is abnormally terminated, for example, due to a power failure. In a recovery operation, redo information in the recovery log is used to reconstruct all transactions at the time of the failure. The undo information is used to undo transactions that did not commit prior to the termination.

Figure 2:
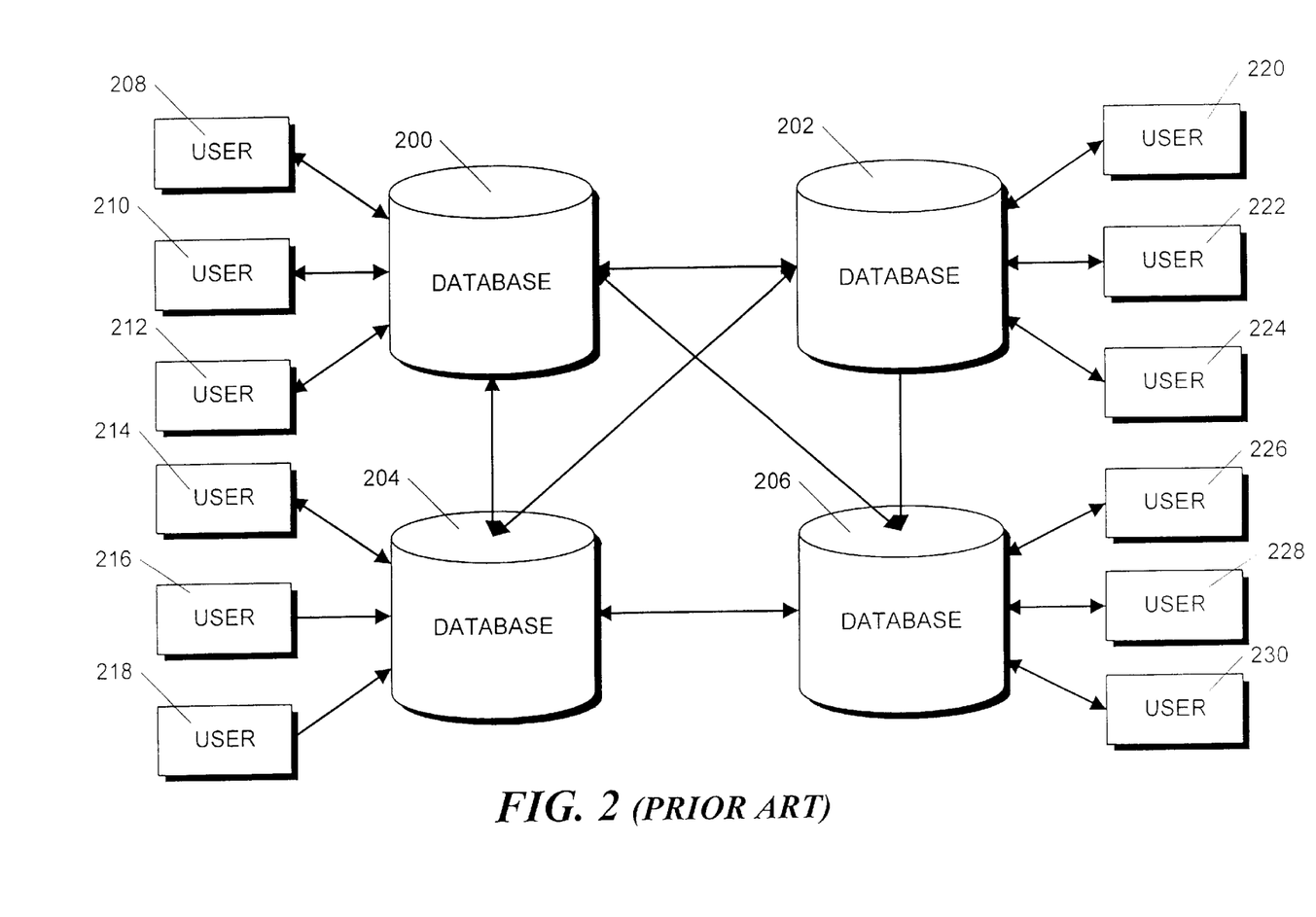
FIG. 2 illustrates, in block schematic form, a distributed database system.

The conventional database system is somewhat complicated in a distributed database system such as shown in FIG. 2 which illustrates, in schematic form, an example of such a distributed database system. The system consists of four database management systems 200, 202, 204 and 206. Each of these database management systems 200–206 contains a replicated copy of data that is in use throughout the system. Each of the database management systems communicates with and is accessed by a plurality of users. For example, database management system 200 may interact with a plurality of users, of which three users 208–212, are shown. Similarly, database management system 204 interacts with users 214–218. Database management system 202 interacts with users 220 and 224 and database management system 206 services users 226–230, Other configurations and numbers of users are within the spirit and scope of the invention.

In such a system, copies of the data maybe maintained on the databases in order to speed up access of the database by the users. In order to ensure data integrity in such a system, it is necessary to ensure that a transaction which affects data that has been replicated on several systems commits in each of the systems. For example, a transaction that affects data stored in system 200 must also be communicated to and commit on systems 202–206. A two-phase commit procedure is used to ensure that the transaction completes in each system. Unlike non-distributed databases where a single change is, or is not, made locally, all participating databases in the distributed database system must all commit, or all roll back, a transaction if there is a system or network failure at a single database. The two-phase commit procedure has two distinct processes that are accomplished in order. The first process occurs in a so called "prepare" phase where a global coordinator or initiating database requests that all distributed databases agree to commit or roll back a transaction. In most distributed database systems, depending on the transaction, any database could serve as the global coordinator. If all participants cannot prepare the transaction for commitment, the global coordinator will instruct all databases to roll back the transaction.

The second portion of the two-phase commit procedure is the actual commit phase which occurs after all participants have responded to the coordinator that they are prepared to commit a transaction. In the commit phase, the coordinator requests that all databases commit the transaction. If there is a machine, network or software failure that occurs during the two-phase commit process, the transaction tables in each database are used by the recovery process to resolve the status of any transaction.

The aforementioned recovery system works well with most database systems. However, for a table that is used to store large data objects, for example, images, large text documents, digitized video or digitized audio data (called "large objects" or LOBs), a single row could comprise many megabytes or even gigabytes. Since a data page is generally limited to 4000 bytes, a single such row must be mapped to many data pages. Such an arrangement is shown in FIG. 3.

Figure 3:
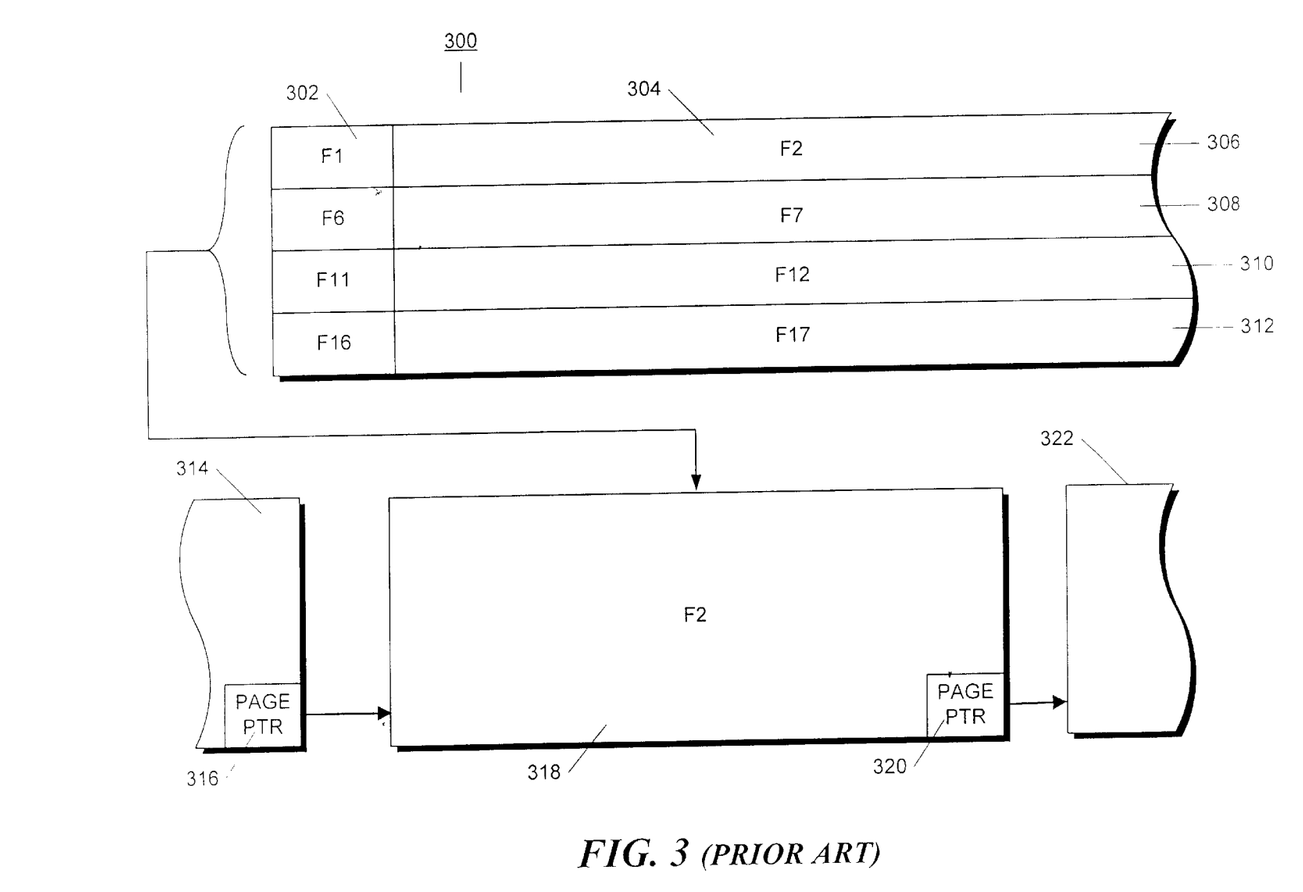
FIG. 3 illustrates, in block schematic form, the relationship of database table rows and data pages in a conventional database system in which large data objects are stored.

In FIG. 3, table 300, of which rows 306, 308, 310, and 312 are shown, is used to store data objects, including large data objects. For example, row 306 has a data object 302 and a large data object 304. Data object 304 may consist of many megabytes and therefore must be mapped to several pages. These pages can be connected together in a page chain as shown in FIG. 3. For example, page 318 stores a portion of the data object F2. The remainder of the F2 object is stored in page chain of which pages 314 and 322 are shown. This page chain is connected together with page pointers. For example, page pointer 316 points to page 318 and page pointer 320 points to page 322.

Figure 4:
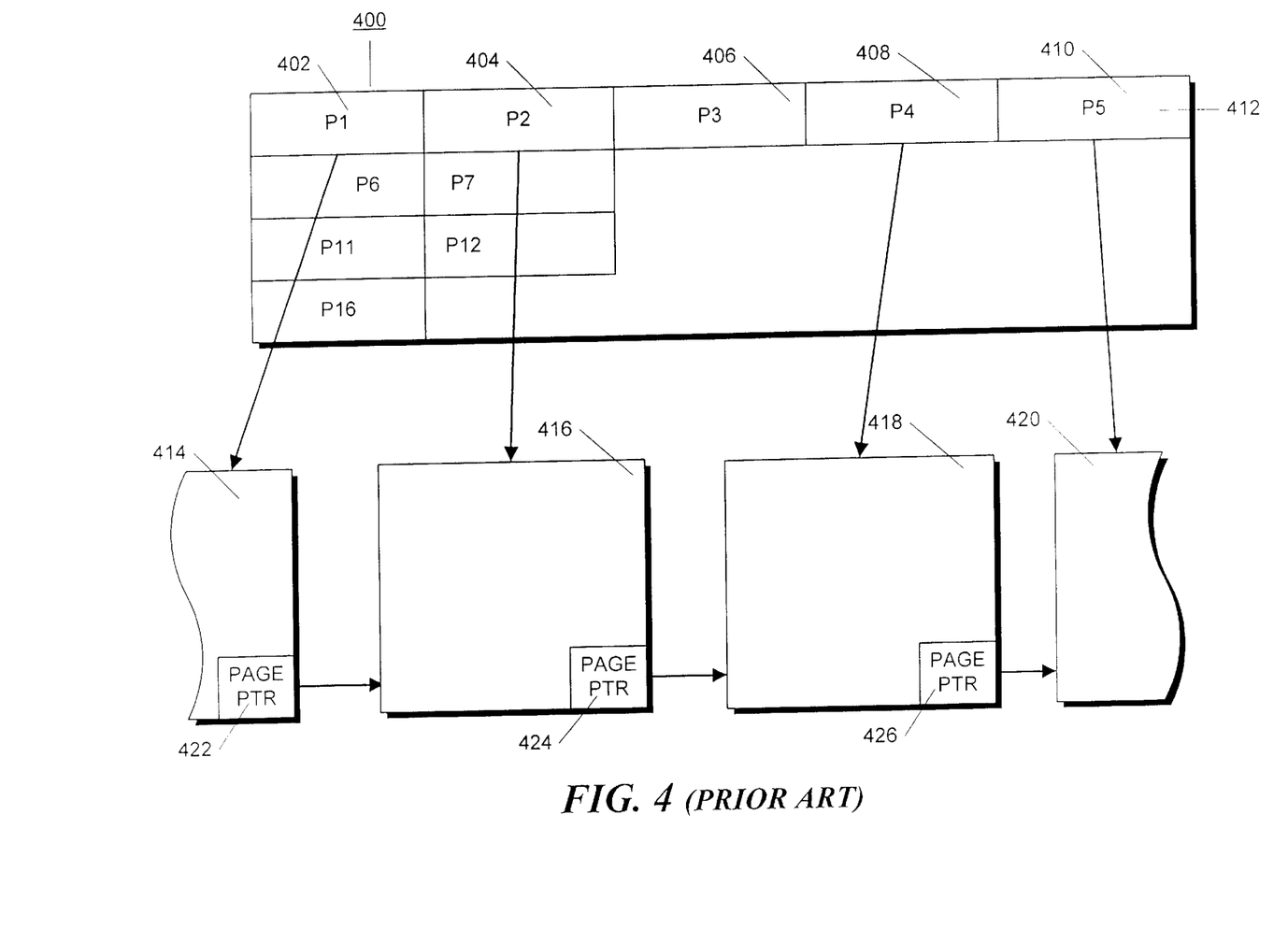
FIG. 4 illustrates, in block schematic form, a space allocation map and its relation to data pages.

A space map associated with the table data illustrated in FIG. 3 is shown in FIG. 4. The map 400 is associated with a page chain of which pages 414, 416, 418 and 420 are shown. The page chain is connected together with page pointers. For example, page pointer 422 points to page 416, page pointer 424 points to page 418 and page pointer 426 points to page 420. The space map 400, which may be contained within one or more pages itself, contains data sections relating to each data page which can be used in the table. For example, data section 402 relates to page 414, data section 404 relates to page 416, data section 408 relates to page 418 and data section 410 relates to page 420. Data section 406 relates to a page which is not currently in the page chain, for example an unused page. Each data section contains information relating to its associated page. This information may be as simple as a single bit indicating whether the associated page is unused (free) or used. Other information relating to the page can also be included in each data section. When table rows are added, the space map is searched to find a page that is unused. When found, this page is added to the page chain and the associated data section in the space map 400 is marked to indicate that the page has been used. Conversely, if a table row is deleted, the data sections corresponding to the pages which store the data from the row are marked to indicate the associated pages are free. In order to allow for recovery, a recovery log is kept of all changes made to the space map. During rollback, changes to the space map can be reversed by sequentially applying "undo" operations to the space map from the log.

When a table is initially populated with these large data objects using the conventional row insert methods, the recovery logs, which typically include the new data which is inserted into the table, are also very large. It is difficult for a conventional database management system to manage such large recovery logs. Logging such large amounts of data not only slows the time to complete this load process, but also impacts the system's overall performance due to contentions for logging devices and the overhead required to manage log archiving. One way to improve loading performance is to use parallel insert jobs. However, many database management systems support only a single log stream, and, in these systems, logging becomes a bottleneck.

One prior art solution to this problem is to provide an option to turn off logging for such types of tables during the loading process. However, the data inserted to such tables may be lost if a system termination occurs before the data pages in the page buffer pool are eventually flushed to persistent storage. Alternatively, in tables in which both logged and unlogged objects exist, the entire table may have to be declared invalid even though the logged objects could be recovered after a system failure.

Another prior art solution is to use a special database load utility to load the data without logging, instead of using the normal insert method to populate the table. However, the load utility process is a single thread process on the entire table and, consequently, it prevents concurrent read/write access by other applications during the loading process. Further, if any type of error occurs during the load process, the newly-loaded data must be deleted and completely reloaded.

Therefore, it is desirable to provide a method and apparatus which can load a database table with large objects without requiring recovery logging and yet be able to recover the loaded data if an abnormal system termination occurs at a subsequent time. It is also desirable to provide a method and apparatus which allows recovery of logged objects in a table that includes both logged and unlogged objects in the event that a recovery is necessary before a backup is performed.

SUMMARY OF THE INVENTION

In accordance with the principles of the invention, database tables which are to be loaded with large data objects are defined with a special logging attribute value. This attribute value causes the database management system to suspend recovery logging for the databases so defined, but to continue with logging control information, such as space management changes. Therefore, during a recovery operation, the control information for LOBs will be recovered as the log entries are applied, but the data will not be recovered because no data recovery entries are made. Normally, since some data entries are invalid, the entire table will be marked as invalid after recovery.

However, in accordance with a preferred embodiment, control information in the recovery log for each LOB has a special status indicator. This status indicator is set to cause the associated LOB entry to be marked as invalid when the log entry is reapplied, for example, during a recovery operation from a media failure.

Rather than invalidating the entire table, the database management system (DBMS) is modified to only prevent access to the LOB entries which have been marked invalid during the recovery process. For example, in accordance with one embodiment, the DBMS could return an SQL "resource unavailable" code to an application which attempts to access an invalid database entry. The DBMS can still access other entries which have been recovered. The selective invalidation of LOBS handles the situation where a database table logging attribute is altered from a "LOG YES" value to a "LOG NO" value and a media recovery is needed before a backup occurs. Alternatively, the selective invalidation handles a situation where a recovery to currency operation is mistakenly used on a table with unlogged objects instead of a recovery to copy operation.

BRIEF DESCRIPTION OF THE DRAWINGS

The above and further advantages of the invention may be better understood by referring to the following description in conjunction with the accompanying drawings in which.

DETAILED DESCRIPTION

Figure 5:
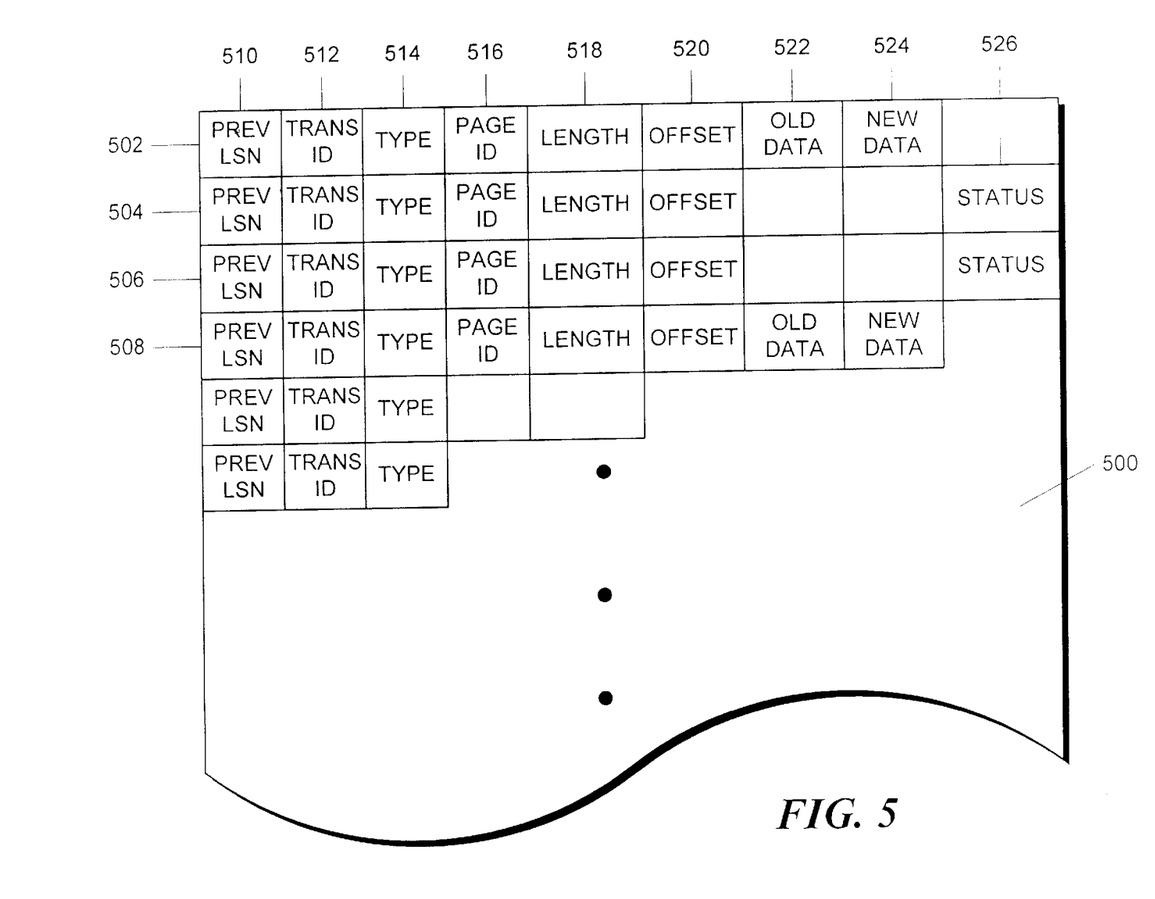
FIG. 5 illustrates a recovery log including a special status indicator in accordance with the principles of the present invention.

FIG. 5 illustrates a portion of the contents of a recovery log constructed in accordance with the principles of the present invention. In particular, a recovery log 500 consists of an entry for each transaction. These entries are illustrated as rows in log 500. For example, row 502 is shown in its entirety whereas rows 504–508 are partially shown. In general, an entry will be entered into the recovery log 500 for each transaction which has been applied to either the data or the space map in order to allocate or deallocate space.

Each entry, for example, entry 502, consists of a number of fields. In a typical system, each log entry has control information, such as a unique log sequence number (LSN) which is always increasing. Each log entry further includes the log sequence number of the previous transaction 510. A transaction ID field 512 and a type field 514 are also included. Possible log entry types include updates, commits, aborts and end fields which after entries signify the end of a commit or abort transaction. In addition, the log entry types can include compensation log records which are used in a conventional fashion during undo transactions. For entries of an update type, additional fields are also included. These include a page ID field 516, a length field 518, and an offset field 520. Entries which are used for data recovery also include old and new data images 522 and 524 which allow the data to be reconstructed. In accordance with the principles of the invention, entries 522 and 524 are not included in log entries for LOBs.

In a preferred embodiment of the present invention, an additional field 526 is included in log entries for large objects. This is a status indicator field which is used to indicate the status of the related LOB record when the space map recovery log entries are reapplied during a recovery scenario, such as a media failure. Thus, large objects, which were inserted or updated without logging, have a status field value that causes these entries to be marked as invalid during recovery. The DBMS system which manages the table is arranged to prevent those data records which are marked as invalid from being accessed instead of invalidating the entire table. Consequently, valid records can be accessed in the conventional fashion, but an attempt by an application to access an invalid data record causes the application to receive a "resource unavailable" SQL code or other similar indicator which prevents access to the invalid records. In this manner, only LOB records are indicated as invalid during a recovery while the remainder of the table is still accessible.

Figure 6:
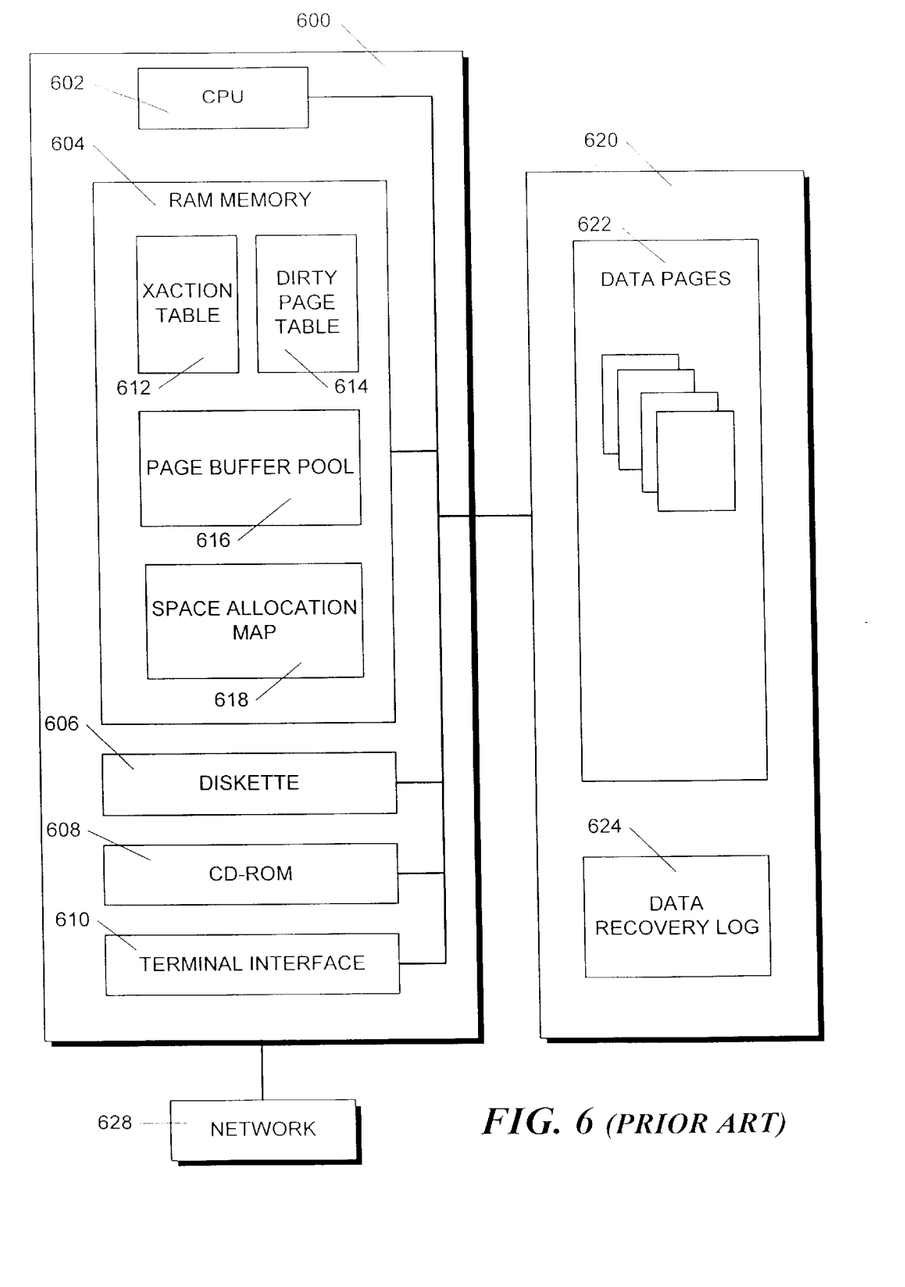
FIG. 6 shows a computer system on which the invention can be implemented.

FIG. 6 is a block diagram of a typical computer system suitable for operation with an illustrative embodiment of the present invention. For example, computer system 600 could be an IBM application system/400 mid-range computer;

however other systems, such as personal computers and mainframe computer systems, may also be utilized. Computer system 600 conventionally contains a CPU 602, a memory 604 and a terminal interface 610 and may also contain a diskette drive 606 and a CD-ROM drive 608. Terminal interface 610 allows developers and users to communicate with computer system 600, normally through a programmable workstation.

The CPU 602 is controlled by an operating system loaded into memory 604.

Such an operating system maybe be a commercially available system such as OS/390 V6, offered by International Business Machine, Inc, of Armonk, N.Y. A database management system (DBMS) is also loaded into memory 604 which, together with the operating system controls the computer system to manage a database. An example of such a DBMS is a commercially available database system such as DB2 for OS/390 V6, also provided by IBM, Inc.

When the computer system is used as a database management system, the memory 604 contains the transaction table 612 which, as previously mentioned, includes one record per active transaction that contains the transaction state (for example, running, committed or aborted.) The memory 604 also includes a page buffer pool 616 that contains the data pages that store the data for a database table and a dirty page table 614 which contains one entry for each page in the buffer pool 616 which has been modified. A space allocation map 618 stores a set of space-map pages which contain status information that indicates whether a particular data page in disk storage has been used.

The computer system 600 is generally connected to a non-volatile storage unit 620 which is used as a secondary memory. Unit 620 may be a magnetic disk drive, an optical storage device, or a well-known combination of different conventional storage devices. While storage 620 is shown as a monolithic entity, it should be understood that it may comprise a variety of devices and that all programs and files shown will not necessarily be contained in any one device. It may for example comprise a disk farm or other distributed storage system without departing from the spirit and scope of the present invention.

The storage unit 620 typically contains the data pages which store the data that is part of the database. During operation data in the page buffer pool 616 will be stored or "flushed" to the data pages in the storage unit 622 to insure that the data is persistent. The storage unit 620 may also contain a conventional recovery log 624 which allows recovery of data which is in the page buffer pool 618 but has not been flushed to storage 620 prior to a system termination.

Computer system 600 may further be connected to a network 628 for communication with other computer systems also connected to the network 628 or to internet connections, such as the World Wide Web. The network 628 may be used to implement a distributed database system such as that illustrated in FIG. 2.

Figure 7A:
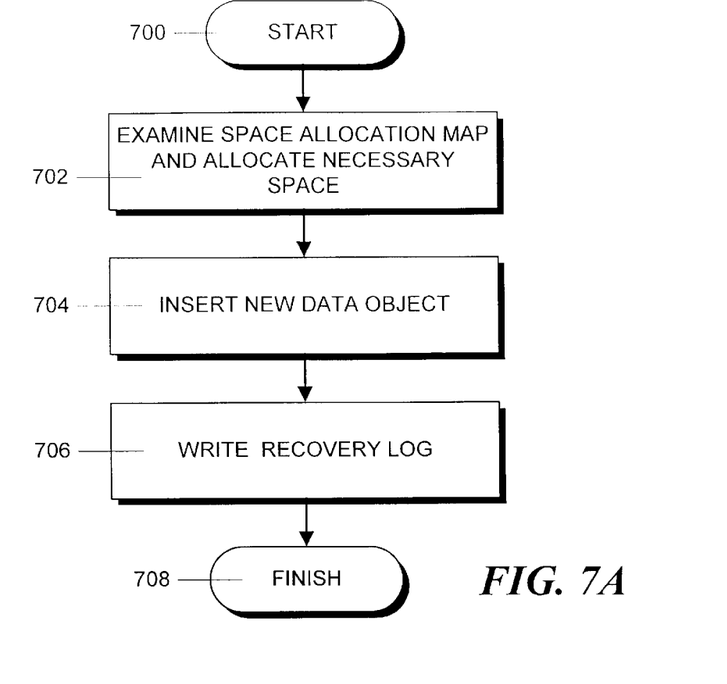
FIGS. 7A and 7B are flow diagrams illustrating the steps in the insertion of a large data object into a table and the deletion of a large object from the table without logging.

FIG. 7A illustrates a flowchart of a method for inserting large data objects into a database table as illustrated in FIG. 3 without requiring data recovery logging. In a preferred embodiment, the table is mapped to data pages in such a way that, for large object data, each page contains data for only a single row. In other embodiments, more than one large object may reside on a page. A page that contains large object data may also contain data for other rows representing other objects. In addition, the entire table within the database is either defined with a special logging attribute value of "LOG NO" or, before inserting a large data object, the logging attribute value is altered from a "LOG YES" value to a "LOG NO" value. As previously mentioned, the "LOG NO" attribute value causes the database management system to suspend recovery logging for the related table, but to continue with the logging of control information, such as space management changes. During operation the attribute value can be altered from "LOG NO" to "LOG YES" to allow objects to be entered into, or removed from, the table with logging. The attribute value can be altered by an ALTER LOB TABLESPACE function (for DB2 for OS/390 V6, mentioned above) or another conventional function, which controls an attribute that determines whether recovery logging will be performed.

The routine starts in step 700 and proceeds to step 702, where the page space map is used to locate one or more pages to store the data. In the case of the preferred embodiment, since each page stores large object data for only one row, additional space will be needed for the new table row. For other embodiments, or other non-large objects, space may be found on existing pages. After space has been allocated, a new data object is inserted into the table in step 704 for example, a conventional $SQL_{13}$ INSERT method. It is assumed that the table will hold LOBs and the logging attribute has "LOG NO" value set.

After the object has been inserted, the recovery log is written for the changes to the space map in step 706, but not for the data changes. The routine for the data object then ends in step 708.

Figure 7B:
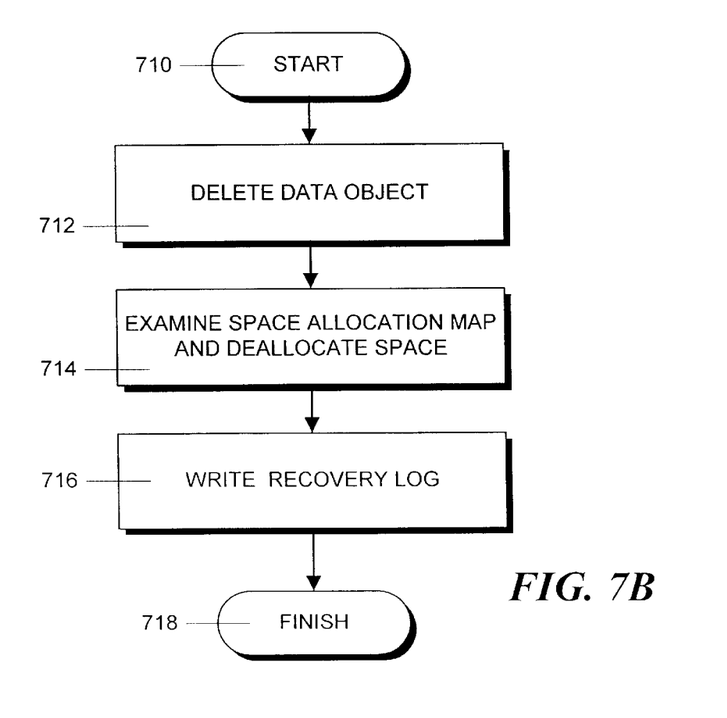

FIG. 7B shows the case of a delete operation. This routine starts in step 710 and proceeds to step 712 in which a large object data is deleted using, for example, a conventional $SQL_{13}$ DELETE statement. However, in accordance with the principles of the invention, the data changes are not logged. In step 714, the space allocation map is examined and the space previously assigned to the object is deallocated and freed. Then, in step 716, the recovery log is written for the changes to the space map in step 714. The routine finishes in step 718. Advantageously, for those database management systems that support parallel load and delete streams, the invention enables inserts and deletes to be conducted in parallel using the normal SQL insert and delete methods.

Figure 8:
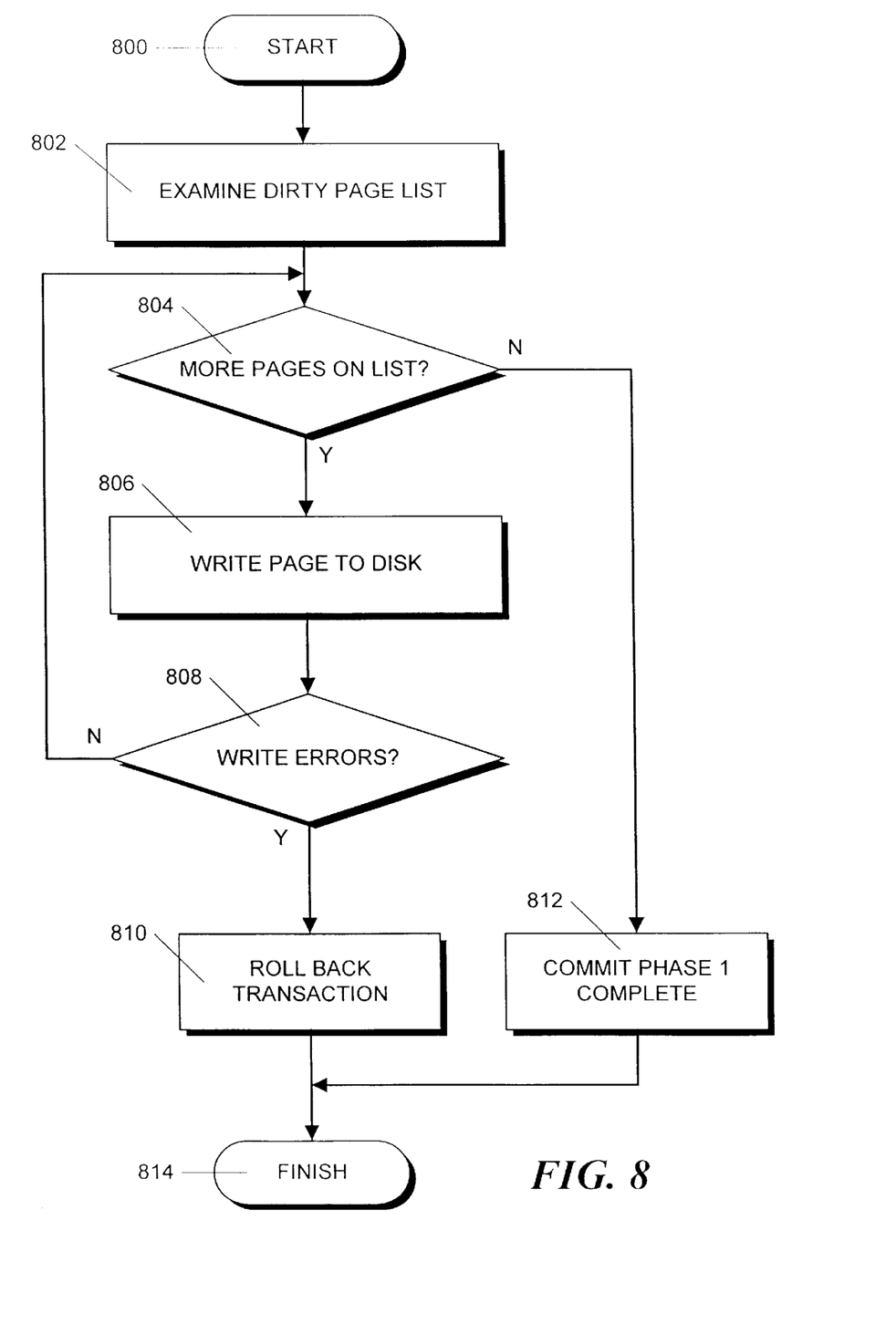
FIG. 8 is a flow diagram illustrating processing of the database pages during a commit phase 1 operation or during a background page flush operation.

In order to insure that the data can be recovered, it is necessary to modify the normal commit phase 1 processing. The modifications are illustrated in FIG. 8 which shows an illustrative routine that writes all changed data pages to disk storage before the end of phase 1 commit in accordance with the principles of the present invention. In particular, this routine starts in step 800 and proceeds to step 802 where the dirty page list is examined to determine if any modified pages exist which have not been written to disk. In step 804 if there are any pages on the list, one of the pages is written to disk in step 806. In step 808 a check is made to determine if any errors occurred during the writing process. If any of the changed data pages cannot be written to disk successfully, the routine branches to step 810 in which the application is informed and the transaction is rolled back at all distributed processors and the routine finishes in step 814.

Alternatively, if, in step 808, no write errors are encountered, the routine branches back to step 804 where the dirty page list is checked to determine whether additional pages exist on the list. If so, steps 806 and 808 are repeated, if not, then the routine branches to step 812 where the commit phase 1 is indicated as completed. The routine then finishes in step 814.

Due to limited memory space in the page buffer pool, a database management system may have to write uncommitted modified data back to disk storage before a transaction is committed. Typically, a database management system will dispatch asynchronous write processes to write modified data pages back to disk storage when the number of modified pages in the page buffer pool has reached a predetermined threshold value. These a synchronous write processes are commonly known as "write engines." The conventional a synchronous write engines must be modified so that, when they are writing modified data belonging to the tables defined with LOG NO attributes in accordance with the principles of the current invention, they report back to the transactions that made the updates any error conditions which were caused by write failure conditions. A routine similar to that shown in FIG. 8 can be used for the write process. This allows each transaction to check and ensure all modified data for which no recovery log entries have been written are successfully flushed to disk before signaling that commit phase 1 has completed. If the modified data is not flushed before commit phase 1 ends, then it is possible for the database management system to lose all or part of the committed data if a system or disk failure occurs.

Figure 9:
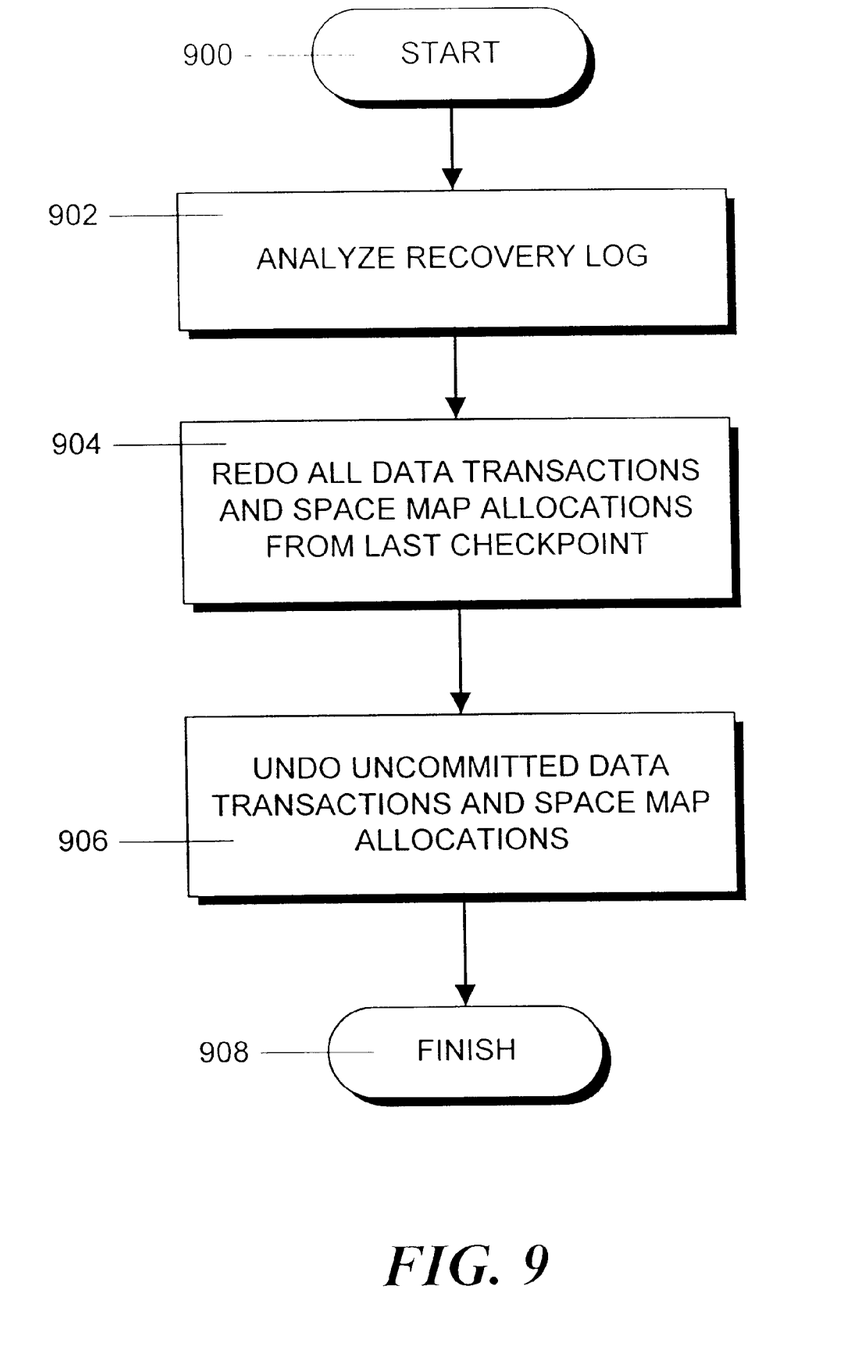
FIG. 9 is a flow diagram illustrating rollback processing which occurs when database changes cannot be committed.

An illustrative restart routine which implements step 810 is shown in FIG. 9. This restart routine starts in step 900 and proceeds to step 902 where the recovery log is analyzed to determine which transactions were committed prior to restart and which transactions were not committed. Next, in step 904, the recovery log redo information is used by scanning forward from the last checkpoint to reapply changes to all data and control information, such as space map allocations, forward from the last checkpoint or copy.

Figure 10:
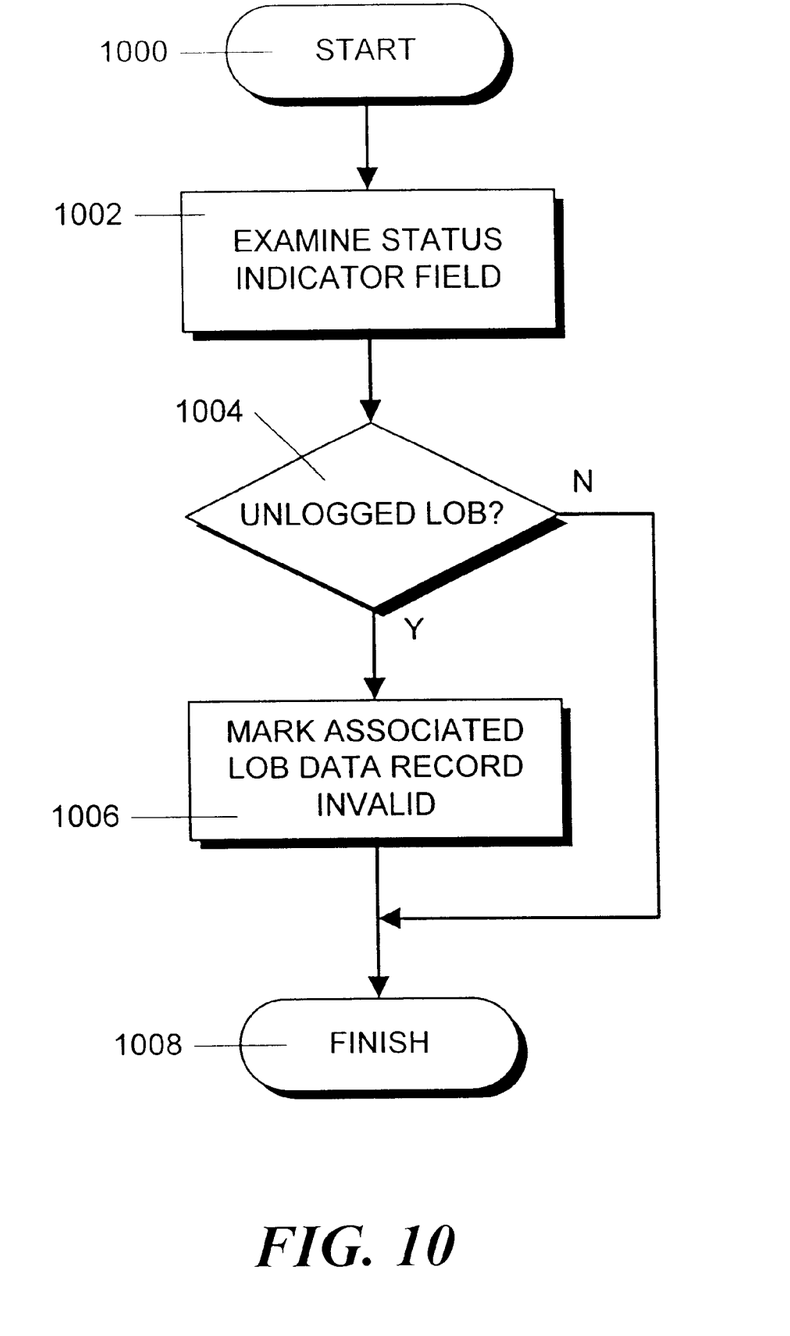
FIG. 10 is a flow diagram illustrating selected portions of a recovery processing routine.

In step 906, all transactions that were not committed prior to the restart are undone using the undo information in the recovery log. The undone transactions include all uncommitted data transactions and all uncommitted space map allocations. Since, in accordance with the principles of the invention, large data objects have been inserted into the table with the table logging attribute set to NO LOG, no redo and undo recovery log data records will be maintained for these entries. Therefore, during restart, the large objects will not be reentered into the table, but the undo step 906 will remove all space map allocations in order to free the space occupied by the uncommitted insert during the restart operation. The routine then finishes in step 908. Even if committed, modified data is successfully written back to disk storage during commit phase 1 processing, it is still possible for a database management system to subsequently lose the data if a media failure occurs in the disk storage. Therefore, provisions must be made for backup of the modified data as soon as the insert/delete processes have completed. Without such a backup, the data updated without logging cannot be recovered on a media failure condition. On a media failure scenario, a table defined with the LOG NO attribute can only be recovered to a point when the last backup was taken. FIG. 10 illustrates a modification made to the recovery routine in accordance with the principles of the invention in order to invalidate unlogged entries upon a recovery. The steps illustrated in FIG. 10 might, for example, be part of step 910 in the recovery routine shown in FIG. 9. The modification starts in step 1000 and proceeds to step 1002 where the status indicator field (for example, field 526 in FIG. 5) is examined. In step 1004 a decision is made based on the value of the status indicator field. If the status indicator field indicates that the associated data record is a large object which was entered without data recover logging, then the data record is marked as invalid as shown in step 1006 and the process finishes in step 1008. Alternatively, if the associated data record was logged as determined in step 1004, then the process proceeds to finish in step 1008.

Figure 11:
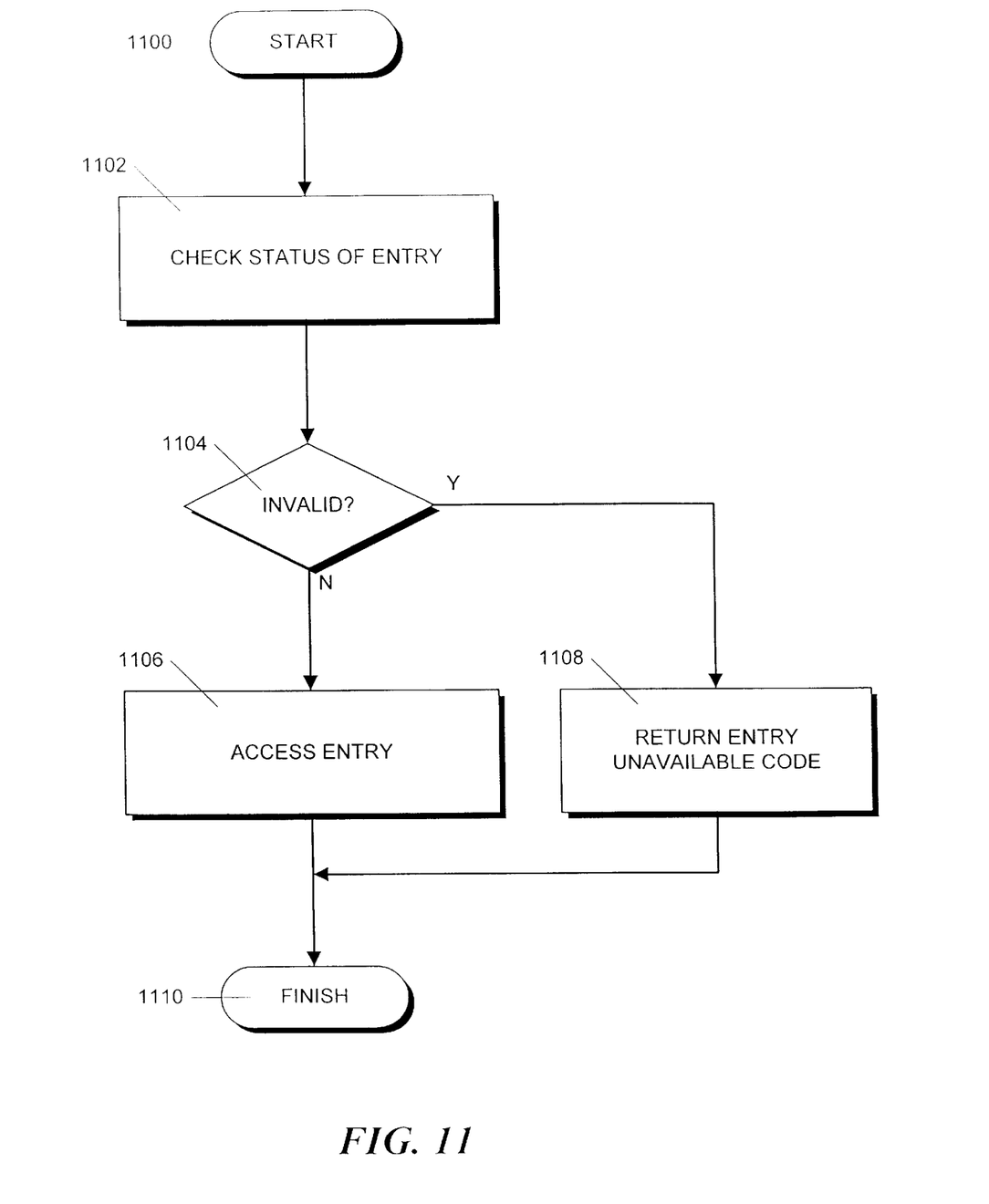
FIG. 11 is a flow diagram illustrating a routine by which a DBMS can access the table entries.

FIG. 11 shows a simple illustrative routine which a DBMS can use to access the entries in a table constructed in accordance with the principles of the invention. This routine starts in step 1100 and proceeds to step 1102 in which the status of the entry is checked. In step 1104 a decision is made. If the entry has been made invalid then, in step 1108, an entry unavailable code is returned.

Alternatively, if the entry has not been made invalid, then in step 1106 access to the entry is allowed. In either case, the routine finishes in step 1110.

In an alternative embodiment, the system may be implemented as a computer program product for use with a computer system. Such implementation may include a series of computer instructions fixed either on a tangible medium, such as a computer readable media (e.g., a diskette for use in drive 606, a CD for use in CD-ROM drive 608, or non-volatile storage 620 as shown in FIG. 6) or transmittable to a computer system, via a modem or other interface device, such as a network 628. The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it will be apparent to those skilled in the art that various changes and modifications can be made that will achieve some of the advantages of the invention without departing from the true scope of the invention. These and other obvious modifications are intended to be covered by the appended claims.

What is claimed is:

1. A method for efficiently recovering from a failure in a database in which a first set of entries have been made with control information recovery logging, but without data recovery logging and a second set of entries have been made with both control information and data recovery logging, the method being for use in a computer system having a database management system for accessing the database, the method comprising:

(a) including a status indicator field in control information log entries associated with the first set of entries;

(b) setting the status indicator field to a first value when the associated data entry was made without data recovery logging and to a second value when the associated data entry was made with data recovery logging; and (c) during a recovery from a failure, marking a data entry invalid when the associated status indicator field has a first value and marking a data entry valid when the associated status indicator field has a second value.

2. The method according to claim 1 further comprising:
(d) preventing the database management system from accessing data entries which are marked as invalid.

3. The method according to claim 2 wherein step (d) comprises:
(d1) returning a resource unavailable code when the database management system attempts to access a data entry which is marked as invalid.

4. The method according to claim 1 further comprising:
(e) allowing the database management system to access data entries which are marked as valid.

5. The method according to claim 1 wherein data entries are made using conventional insert and delete commands.

6. Apparatus for efficiently recovering from a failure in a database in which a first set of entries have been made with control information recovery logging, but without data recovery logging and a second set of entries have been made with both control information and data recovery logging, the method being for use in a computer system having a database management system for accessing the database, the apparatus comprising:
a status indicator field in control information log entries associated with the first set of entries;
a logging mechanism that sets the status indicator field to a first value when the associated data entry was made without data recovery logging and to a second value when the associated data entry was made with data recovery logging; and
a recovery mechanism that operates during a recovery from a failure and marks a data entry invalid when the associated status indicator field has a first value and marks a data entry valid when the associated status indicator field has a second value.

7. The apparatus according to claim 6 further comprising:
a database control that prevents the database management system from accessing data entries which are marked as invalid.

8. The apparatus according to claim 7 wherein the database control comprises a retrieval mechanism that returns a resource unavailable code when the database management system attempts to access a data entry which is marked as invalid.

9. The apparatus according to claim 6 further comprising
a database access system that allows the database management system to access data entries which are marked as valid.

10. The apparatus according to claim 6 wherein data entries are made using conventional insert and delete commands.

11. A computer program product for efficiently recovering from a failure in a database in which some entries have been made with control information logging including a status indicator field, but without data recovery logging and other entries have been made with both control information and data recovery logging, the method being for use in a computer system having a database management system for accessing the database, the computer program product comprising a computer usable medium having computer readable program code thereon, including:
program code for setting the status indicator field to a first value when the associated data entry was made without data recovery logging and to a second value when the associated data entry was made with data recovery logging; and
program code operable during a recovery from a failure, for marking a data entry invalid when the associated status indicator field has a first value and for marking a data entry valid when the associated status indicator field has a second value.

12. The computer program product according to claim 11 further comprising program code for preventing the database management system from accessing data entries which are marked as invalid.

13. The computer program product according to claim 12 wherein the program code for preventing the databases management system from accessing invalid entries comprises program code for returning a resource unavailable code when the database management system attempts to access a data entry which is marked as invalid.

14. The computer program product according to claim 11 further comprising program code for allowing the database management system to access data entries which are marked as valid.

15. The computer program product according to claim 11 wherein data entries are made using conventional insert and delete commands.

16. A method for efficiently recovering from a failure in a database in which large data objects have been inserted and updated with a first set of entries having been made with control information logging, but without data recovery logging and a second set of entries having been made with both control information and data recovery logging, the method being for use in a computer system having a database management system for accessing the database, the method comprising:
(a) including a status indicator field in control information log entries associated with the first set of entries;
(b) setting the status indicator field to a first value when a large data object is inserted into the database without data recovery logging and to a second value when another data entry is made with data recovery logging; and
(c) during a recovery from a failure, marking a data entry invalid when the associated status indicator field has a first value and marking a data entry valid when the associated status indicator field has a second value.

17. The method according to claim 16 further comprising:
(d) preventing the database management system from accessing large data objects which are marked as invalid.

18. The method according to claim 17 wherein step (d) comprises:
(d1) returning a resource unavailable code when the database management system attempts to access a large data object which is marked as invalid.

19. The method according to claim 16 further comprising:
(e) allowing the database management system to access data entries which are marked as valid.

20. The method according to claim 16 wherein all data entries are made using conventional insert and delete commands.

* * * * *